United States Patent
Prasad et al.

(10) Patent No.: US 10,484,430 B2
(45) Date of Patent: *Nov. 19, 2019

(54) JUST-IN-TIME ACCESS BASED ON SCREENING CRITERIA TO MAINTAIN CONTROL OF RESTRICTED DATA IN CLOUD COMPUTING ENVIRONMENTS

(71) Applicant: MICROSOFT TECHNOLOGY LICENSING, LLC, Redmond, WA (US)

(72) Inventors: Ramnath Prasad, Redmond, WA (US); Pradeep Ayyappan Nair, Kirkland, WA (US); Veena Ramachandran, Sammamish, WA (US); Sandeep Kalarickal, Kirkland, WA (US); Thomas Knudson, Draper, UT (US); Pavan Gopal Bandla, Duvall, WA (US); Chetan Shankar, Bothell, WA (US); Ranajoy Sanyal, Bothell, WA (US); Qingsu Wu, Redmond, WA (US); Chi Zhou, Woodinville, WA (US); Doug Kirschner, Seattle, WA (US); Ryan Meyer, Bothell, WA (US); Thomas Keane, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/589,486

(22) Filed: May 8, 2017

(65) Prior Publication Data
US 2017/0244760 A1    Aug. 24, 2017

Related U.S. Application Data

(63) Continuation-in-part of application No. 14/933,803, filed on Nov. 5, 2015.

(51) Int. Cl.
*H04L 29/06* (2006.01)
*H04L 29/08* (2006.01)
*G06F 8/60* (2018.01)

(52) U.S. Cl.
CPC ............ *H04L 63/20* (2013.01); *H04L 63/105* (2013.01); *H04L 63/107* (2013.01);
(Continued)

(58) Field of Classification Search
CPC ..... H04L 63/20; H04L 63/108; H04L 63/107; H04L 67/1021; H04L 63/105; H04L 29/06; G06F 17/30917; G06F 8/60
(Continued)

(56) References Cited

U.S. PATENT DOCUMENTS 6,598,034 B1  7/2003  Kloth
6,615,240 B1  9/2003  Sullivan et al.
(Continued)

FOREIGN PATENT DOCUMENTS

EP    1881447 A1    1/2008

OTHER PUBLICATIONS

International Search Report and Written Opinion dated Feb. 6, 2017 in International Patent Application No. PCT/US2016/060591, 12 pages.
(Continued)

*Primary Examiner* — Kevin Bechtel
*Assistant Examiner* — Quazi Farooqui
(74) *Attorney, Agent, or Firm* — Shook, Hardy & Bacon LLP (57) ABSTRACT

A JIT service in a cloud computing environment manages just-in-time access to resources in the cloud computing environment for DevOps personnel who do not have persistent access to restricted data or the ability to modify the cloud computing environment to gain access to restricted
(Continued)

data. When JIT access to a resource is requested by a DevOps device, the JIT service retrieves a JIT policy for the resource that includes screening criteria limiting automatic granting of JIT access to DevOps personnel who meeting the screening criteria. Screening information for the DevOps personnel is evaluated against one or more screening requirements set forth by the screening criteria. If the screening criteria and any other criteria of the JIT policy are satisfied, the JIT service provisions JIT access to the resource for the DevOps device.

18 Claims, 8 Drawing Sheets

(52) U.S. Cl.
CPC ........ *H04L 63/108* (2013.01); *H04L 67/1021* (2013.01); *G06F 8/60* (2013.01)

(58) Field of Classification Search
USPC .......................... 726/1, 2, 4, 5, 19; 713/182
See application file for complete search history.

(56) References Cited

U.S. PATENT DOCUMENTS

| | | | |
|---|---|---|---|
| 8,396,838 B2 | 3/2013 | Brockway et al. | |
| 8,468,244 B2 | 6/2013 | Redlich et al. | |
| 8,498,941 B2 | 7/2013 | Felsher | |
| 8,537,663 B2 | 9/2013 | Poulson et al. | |
| 8,613,041 B2* | 12/2013 | Hopen | G06F 21/6218 726/1 |
| 8,707,397 B1* | 4/2014 | Wilkinson | G06F 9/465 726/4 |
| 8,984,644 B2 | 3/2015 | Oliphant et al. | |
| 2002/0174333 A1 | 11/2002 | Harrah et al. | |
| 2005/0027672 A1* | 2/2005 | Arndt | G06Q 20/4014 |
| 2009/0281935 A1 | 11/2009 | Junger | |
| 2009/0287837 A1 | 11/2009 | Felsher | |
| 2010/0131755 A1 | 5/2010 | Zhu et al. | |
| 2010/0250497 A1 | 9/2010 | Redlich et al. | |
| 2011/0131306 A1* | 6/2011 | Ferris | G06F 9/5072 709/223 |
| 2011/0179271 A1 | 7/2011 | Orsini et al. | |
| 2012/0080520 A1 | 4/2012 | Kochevar | |
| 2012/0210399 A1* | 8/2012 | Jennings | G06F 21/604 726/4 |
| 2012/0317132 A1 | 12/2012 | Brady et al. | |
| 2013/0133024 A1 | 5/2013 | MacLeod et al. | |
| 2013/0283087 A1 | 10/2013 | Behrendt et al. | |
| 2014/0081984 A1 | 3/2014 | Sitsky et al. | |
| 2014/0164769 A1 | 6/2014 | D'Souza | |
| 2014/0189641 A1 | 7/2014 | Anderson et al. | |
| 2015/0339497 A1* | 11/2015 | Kurian | G06F 21/78 726/34 |
| 2015/0347751 A1* | 12/2015 | Card | H04L 63/20 726/23 |
| 2016/0088023 A1 | 3/2016 | Handa et al. | |
| 2016/0112375 A1 | 4/2016 | Cohen et al. | |
| 2017/0134392 A1 | 5/2017 | Chattopadhyay et al. | |
| 2017/0244723 A1 | 8/2017 | Prasad et al. | |

OTHER PUBLICATIONS

International Search Report and Written Opinion dated Feb. 16, 2017 in International Patent Application No. PCT/US2016/060605, 12 pages.
Roberts, Chris, "Cloud, Risk and Security", Sep. 10-12, Wellington, New Zealand, 65 pages.
Governance, Risk and Compliance (GRC) Framework, MetricStream White Papers, 21 pages. Available at: http://www.metricstream.com/whitepapers/html/GRC_frame.htm.
Non-Final Office Action dated Jul. 11, 2017 in U.S. Appl. No. 14/933,803, 36 pages.
"Cloud Access Manager", https://www.quest.com/documents/cloud-access-manager-datasheet-68555.pdf, Retrieved on: Feb. 3, 2017.
"Final Office Action Issued in U.S. Appl. No. 14/933,803", dated Dec. 7, 2017, 40 pages.
"Non Final Office Action Issued in U.S. Appl. No. 14/933,803", dated Jun. 8, 2018, 34 pages.
"Non Final Office Action Issued in U.S. Appl. No. 15/589,475", dated Aug. 10, 2018, 34 pages.

* cited by examiner

FIG. 1.

| RESOURCE | ALLOWED GEOLOCATION(S) |
|---|---|
| RESOURCE 1 | USA |
| RESOURCE 2 | USA, GERMANY |
| RESOURCE 3 | UNRESTRICTED |

*FIG. 2.*

| RESOURCE | RESTRICTED GEOLOCATION(S) |
|---|---|
| RESOURCE 1 | GERMANY |
| RESOURCE 2 | UNRESTRICTED |
| RESOURCE 3 | USA |

*FIG. 3.*

| RESOURCE | TYPES OF ACCESS | ALLOWED GEOLOCATION(S) |
|---|---|---|
| RESOURCE 1 | TYPE 1 | UNRESTRICTED |
| RESOURCE 1 | TYPE 2 | USA, GERMANY |
| RESOURCE 1 | TYPE 3 | USA |
| RESOURCE 2 | TYPE 1 | USA, GERMANY |
| RESOURCE 2 | TYPE 2 | USA, GERMANY |
| RESOURCE 2 | TYPE 3 | GERMANY |
| ... | ... | ... |

*FIG. 4.*

| RESOURCE 502 | TYPES OF ACCESS 504 | ALLOWED GEOLOCATION(S) 506 |
|---|---|---|
| RESOURCE 1 | TYPE 1 | UNRESTRICTED |
| RESOURCE 1 | TYPE 2 | USA |
| RESOURCE 1 | TYPE 3 | USA, GERMANY |
| RESOURCE 2 | TYPE 1 | USA |
| RESOURCE 2 | TYPE 2 | USA, GERMANY |
| RESOURCE 2 | TYPE 3 | USA, GERMANY |
| ... | ... | ... |

JUST-IN-TIME ACCESS BASED ON SCREENING CRITERIA TO MAINTAIN CONTROL OF RESTRICTED DATA IN CLOUD COMPUTING ENVIRONMENTS

CROSS-REFERENCE TO RELATED APPLICATIONS

This application is a continuation-in-part of U.S. application Ser. No. 14/933,803, entitled INCIDENT MANAGEMENT TO MAINTAIN CONTROL OF RESTRICTED DATA IN CLOUD COMPUTING ENVIRONMENTS. This application is also related by subject matter to the following applications: U.S. application Ser. No. 14/933,815, entitled MAINTAINING CONTROL OVER RESTRICTED DATA DURING DEPLOYMENT TO CLOUD COMPUTING ENVIRONMENTS; and U.S. application Ser. No. 15/589,475, filed on even data herewith and entitled JUST-IN-TIME ACCESS BASED ON GEOLOCATION TO MAINTAIN CONTROL OF RESTRICTED DATA IN CLOUD COMPUTING ENVIRONMENTS. The aforementioned applications are assigned or under obligation of assignment to the same entity as this application, and are herein incorporated by reference in their entirety.

BACKGROUND

Cloud computing environments, including data centers, server farms and the like, have become increasingly common to provide vast amounts of computational and storage resources. For example, cloud computing environments have been utilized to store and retrieve vast amounts of data for various service applications (e.g., web applications, email services, search engine services, etc.). These networked systems typically include a large number of nodes distributed throughout one or more data centers, in which each node provides a physical machine or a virtual machine running on a physical host.

Due partly to the complexity and large number of the nodes that may be included within such cloud computing environments, resolving incidents and deploying software updates can be a time-consuming and costly process. Data control policies imposed on cloud computing environments also contribute to the challenges of incident management and deployment. In particular, many cloud computing environments are subject to data control policies that limit who has access to certain data and to the control plane, which allows for implementing changes to the production environment (i.e., the physical and logical environment where cloud service infrastructure components providing services to customers are hosted). These data control policies may be driven by a variety of factors, such as, for instance, customer-driven requirements, laws, or industry best practices. Such data control policies may restrict a given cloud computing environment to certain service-providing entities or personnel authorized to access certain data or the production environment, geographical boundaries, or certain logical or physical components within a given production environment. By way of example to illustrate, customers in highly regulated industries such as healthcare may require restriction of their computing environment to certain screened personnel. As another example, some customers may be subject to regulations that restrict the geographical boundaries in which cloud services are provided or where restricted data is stored, processed, or both. Such regulations may include the personnel authorized to have access to restricted data and to the control plane of the production environment. Complying with these data control policies poses challenges in how the cloud services are deployed and managed to maintain the control over the data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of the technology described herein generally relate to resolving incidents in cloud computing environments subject to data control requirements in a manner that maintains control of data. In accordance with some configurations, a cloud computing environment is operated by operating personnel who are authorized to have access to restricted data in the cloud service. However, the number and available expertise of the operating personnel may not be sufficient to handle all incidents faced by the cloud computing environment. Accordingly, techniques are provided herein that allow DevOps personnel to perform incident management on the cloud computing. The DevOps personnel do not have persistent access to restricted data and the control plane of the cloud computing environment that would allow the DevOps personnel to modify the cloud computing environment in a way that would give the DevOps personnel access to restricted data. The techniques described herein include providing just-in-time (JIT) access to DevOps personnel to resolve an incident. The JIT access can be limited to a certain level or type of access to a particular resource in the cloud computing environment and also limited in time such that the JIT access is revoked when a time period expires. In accordance with some aspects, JIT access to resources can be based on JIT policies for the resources that include screening criteria limiting JIT access to DevOps personnel having screening information meeting the screening criteria.

When a request for JIT access to a resource is received from a DevOps device, the request is evaluated by a JIT service of the cloud computing environment to determine if the request can be automatically granted. A JIT policy for the resource is retrieved from a database of JIT policies for resources in the cloud computing environment. If the JIT policy includes screening criteria, screening information for the DevOps personnel is determined. The screening information is then evaluated to determine if it satisfies one or more screening requirements set forth by the screening criteria for the resource. If the screening criteria and any other criteria specified by the JIT policy are satisfied, the request is automatically granted, and the JIT service provisions a JIT access session for the DevOps device.

BRIEF DESCRIPTION OF THE DRAWINGS

Aspects of the disclosure are described in detail below with reference to the attached drawing figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, data control policies on cloud computing environments often limit who has access to certain data and to the control plane to implement changes to the production environment (i.e., the physical and logical environment where cloud service infrastructure components providing services to customers are hosted). In accordance with some data control policies, data stored by a cloud service includes both non-restricted data and restricted data. While access to non-restricted data may be more generally available, access to restricted data is available only to individuals who satisfy the requirements dictated by the data control policies. As used herein, the term "operating personnel" is used to refer to the individuals who have persistent access to, and do not require pre-approval to access, restricted data. The individuals who are considered operating personnel may vary depending on the applicable data control policies of the cloud computing environment. By way of example only, operating personnel may be required to reside in the country at which the cloud computing environment is located and have passed screening requirements (e.g., background/security clearance checks). Operating personnel may be a third party entity, authorized personnel either within a given entity or across multiple entities. Operating personnel is typically defined by the cloud service provider, but in some instances, operating personnel may be defined by the customer.

As used herein, "restricted data" includes any data whose access is restricted to and/or controlled by operating personnel. By way of example only and not limitation, restricted data may include customer content/data, end user identifiable information, and access control data. Customer content is defined as content directly created by customer users and all data, including all text, sound, software or image files that customers provide, or are provided on customers' behalf, through use of the services. This includes but is not limited to: email body (full or partial), email attachment body, information in the body of a file, IM or voice conversations, customer generated blob or structured storage data, customer's binaries running in virtual machines, customer-owned security information/secrets (certificates, encryption keys, storage keys, customer address list data (name, email address(es), office address, phone numbers, manager/direct reports, job title, distribution group memberships), network packet payloads, database contents, service bus message contents, etc. End user identifiable information is defined as data unique to a user, or generated from their use of the service; is linkable to an individual user and does not include customer content. This includes but is not limited to: user specific Internet Protocol (IP) address, email address, email subject line or email attachment name, user name, display name, office number, employee ID, address book data, behavioral/usage data that is linkable to an individual user, location information, machine name, etc. Access control data is used to manage access to other types of data or functions within the environment, including access to customer content or end user identifier information. It includes passwords, security certificates, and other authentication-related data, such as: passwords to platform components; private keys of certificates used to manage platform components.

Alternatively, "non-restricted" data may be more generally accessible and not limited to access by operating personnel. By way of example only and not limitation, non-restricted data may include account/administrator data, payment data, organization identifiable information, and system metadata. Account/administrator data is information about administrators provided during sign-up, purchase, or administration of the services, such as: name of the customer company name (e.g. "Contoso"), Internet Domain Name of the customer (without user name; e.g. "contoso.cn"), customer company billing address, name, user name, email address of administrator of a service hosting a service, IP address of such an administrator's computer or of customer servers (i.e., not tied to end user), etc. Payment Data is information about payment instruments such as credit card details. It is subject to other security precautions but may not considered "restricted" for access restrictions addressed herein. Organization identifiable information is defined as data that can be used to identify a particular tenant (generally configuration or usage data), is not linkable to an individual user, and does not contain customer content. This may include: tenant ID, customer subscription IDs, aggregated behavioral/usage data associable with a tenant but not a user, tenant usage data, tenant IP addresses (e.g. IP Addresses associated with customer's virtual machines or on premise servers (but not individual end users), etc. System metadata comprises operations data, such as: service logs (provided they don't contain restricted data), technical information about a subscription (e.g. service topology), technical information about a tenant (e.g. customer role name), configuration settings/files, service status, performance metrics, IP addresses used for internet transit service (firewall, netflow, sflow), etc.

The data control policies limiting who can access restricted data and make certain changes to the production environment of cloud computing environments poses challenges to cloud service providers. In particular, operation of a cloud service requires managing incidents, which may include, for instance, maintenance tasks, deployment incidents, live site incidents, customer reported incidents, and support requests. Additionally, operation of a cloud service requires periodic updates and patches to be deployed to the production environment. In the context of a cloud computing environment in which access to restricted data and the control plane are limited to operating personnel, it may be difficult to properly provide incident management and software/firmware deployment as the number and available expertise of the operating personnel may not be sufficient to properly maintain the cloud computing environment.

Aspects of the technology described herein are directed to technological improvements that allow a cloud service provider to employ DevOps personnel to facilitate incident management in cloud computing environments while satisfying data control policies that govern the access to restricted data and the control plane of the cloud computing environments. As used herein, "DevOps personnel" include individuals from engineering teams of a cloud service provider (including subsidiaries, affiliates, vendors, etc.) who do not have access to "restricted data" and unlimited access to the control plane of a cloud computing environment. In some instances, the DevOps personnel may not reside within the country within which the cloud computing environment is located and may not be subject to the same security screening requirements applied to the operating personnel.

In accordance with aspects of the present disclosure, access control techniques are provided to allow the DevOps personnel to facilitate incident management while ensuring that the DevOps personnel do not have the technical means to obtain unapproved access to restricted data or to the control plane to implement changes to the production environment of a cloud computing environment that would give the DevOps personnel the ability to access restricted data. More particularly, the access control techniques for incident management discussed herein are directed to providing DevOps personnel with just-in-time (JIT) access to resources in the production environment of a cloud computing environment in order to perform incident management. JIT access allows DevOps personnel to be provisioned with near real time access to the production environment without providing the DevOps personnel persistent access to the production environment. The JIT access provides the DevOps personnel with access to resources that is both limited in scope (i.e., the resource and/or the level/type of access permitted) as well as limited in time (i.e., the JIT access is revoked after a set period of time).

In accordance with some aspects, JIT access for a requested resource can be automatically granted based on a JIT policy for the resource. The JIT access request is evaluated against the JIT policy, and the request is automatically granted if criteria of the JIT policy is satisfied. In some instances, the JIT policy for a resource can include geolocation criteria that governs JIT access to the resource based on the geolocation of the DevOps device requesting JIT access satisfying the geolocation criteria. In some instances, the JIT policy for a resource can include screening criteria that governs JIT access to the resource based on screening information of the DevOps personnel requesting JIT access satisfying one or more screening requirements. In instances in which JIT access is not automatically granted, the operating personnel (as the data custodian/trustee of the cloud computing environment) may be given the ability to review a JIT access request from DevOps personnel and determine whether to grant or deny the requested access.

Figure 1:
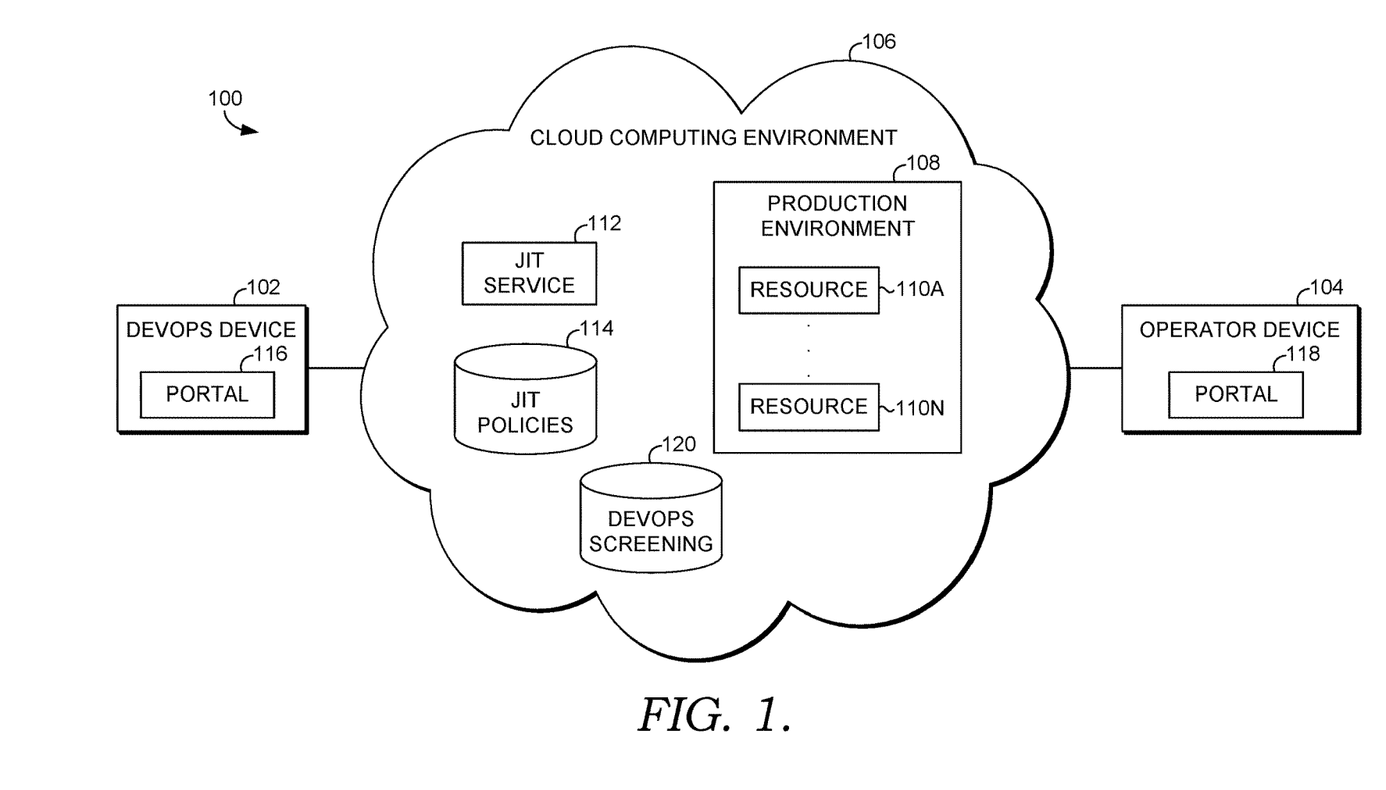
FIG. 1 is a block diagram showing a system for JIT access to a cloud computing environment for incident management in accordance with aspects of the present disclosure.

With reference to FIG. 1, a block diagram is provided illustrating an exemplary system 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 includes a DevOps device 102, an operator device 104, and a cloud computing environment 106. It should be understood that the system 100 shown in FIG. 1 is an example of one suitable computing system architecture. Each of the components shown in FIG. 1 may be implemented via any type of computing device, such as computing device 900 described with reference to FIG. 9, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of DevOps devices, operator devices, and cloud computing environments may be employed within the system 100 within the scope of the technology described herein. Each may comprise a single device or multiple devices cooperating in a distributed environment. For instance, the cloud computing environment 106 can comprise multiple devices that collectively provide the functionality described herein. Additionally, other components not shown may also be included within the network environment.

As shown in FIG. 1, the cloud computing environments 106 includes a production environment 108, which comprises the physical and logical environment where cloud service infrastructure components providing services to customers are hosted. This includes systems that store/process both restricted and non-restricted data. The production environment is made up of a number of resources 110. These resources include physical devices (e.g., servers, storage devices, memory, routers, etc.), as well as software running on and data stored on the physical devices.

The cloud computing environment 106 also includes a JIT service 112, which is responsible for handling JIT access to the resources 110 for DevOps personnel. In accordance with some aspects of the present disclosure, the JIT service 112 examines requests for JIT access to resources 110 using JIT policies for the resources stored in a JIT policy database 114. In instances in which the JIT policies are satisfied, the JIT service 112 can automatically grant JIT access to the requested resources 110. In other instances (e.g., when JIT policies are not satisfied), the JIT service 112 can elevate JIT access requests for approval by operating personnel.

When an incident occurs, incident information is logged and provided to the DevOps personnel via the portal 116 on the DevOps device 102. The incident information provided to the DevOps personnel only includes non-restricted data. The DevOps personnel reviews the incident information and determines that JIT access to a resource 110 is required to resolve the incident. As such, the DevOps personnel employs the portal 116 to submit a JIT access request to the JIT service 112. The JIT access request may specify a number of parameters regarding the requested access including the resource 110 for which JIT access is requested. In various configurations, the JIT access request also specifies a particular level or type of access to the requested resource 110. The JIT access request can also specify other information, such as the incident for which the JIT access is requested (e.g., via an incident number or other identifier).

When the JIT service 112 receives the request for JIT access to the requested resource 110 from the portal 116 on the DevOps device 102, the JIT service 112 examines the request based on a JIT policy for the requested resource 110. The JIT policies database 114 stores a JIT policy for each of a number of resources 110 in the production environment 108. In response to receiving the JIT access request, the JIT service 112 accesses, from the JIT policies database 114, a JIT policy for the resource 110 for which JIT access is requested. The JIT service 112 examines information regarding the JIT access request against the JIT policy to determine if criteria set forth by the JIT policy is satisfied in order to automatically grant the JIT access request. In this determination, the JIT service 112 may consider information, such as the DevOps personnel requesting the JIT access (e.g., based on team, role, etc.), whether there is an active incident, type of incident, and level/type of access requested.

If JIT access is automatically granted by the JIT service 112, a notice regarding the grant may be provided to the operating personnel via the portal 118 on the operator device 104. Alternatively, if JIT access is not automatically granted (e.g., criteria of the JIT policy is not satisfied), the request can be forwarded to the operating personnel via the portal 118. The operating personnel reviews the details of the JIT access request and determines whether to approve or deny the JIT access.

In either case of automatic approval via the JIT service 112 or approval by the operating personnel, the JIT service 112 provisions JIT access to the requested resource 110. This may include providing a particular level or type of access to the requested resource 110 to the portal 116 on the DevOps device 102 and setting a time limit for the JIT access. The DevOps personnel may then access the production environment according to the granted level/type of access using the portal 116. When the time limit expires, the JIT access is revoked. Alternatively, the DevOps personnel and/or the operating personnel can select to revoke the JIT access if the access is no longer needed (e.g., the incident is resolved) before the time limit expires.

In accordance with some configurations, the JIT policy for at least some resources 110 sets forth geolocation criteria that restricts JIT access to the resources 110 to DevOps devices located within particular geolocations. When the JIT access request for a resource 110 is received by the JIT service 112, the JIT service determines whether the JIT policy for the requested resource 110 includes geolocation criteria. If so, the JIT service 112 retrieves geolocation information for the DevOps device and compares the geolocation information for the DevOps device against the geolocation criteria to determine if the geolocation criteria is satisfied. If the geolocation criteria and any other criteria specified by the JIT policy for the requested resource are satisfied, the JIT access is automatically granted.

Figure 2:
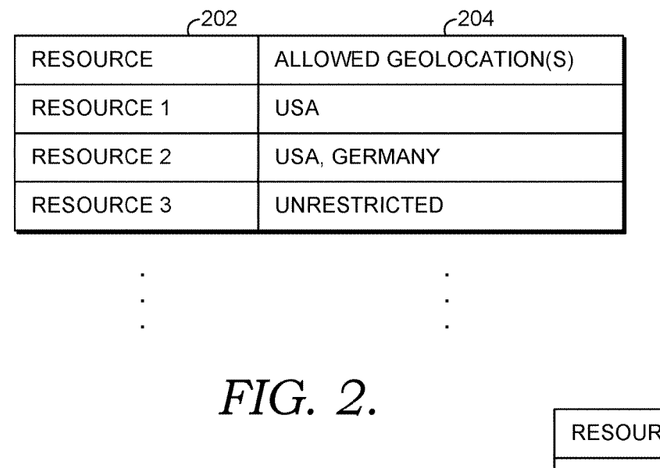
FIGS. 2-5 are diagrams illustrating examples of geolocation criteria of JIT policies for controlling JIT access to resources in a cloud computing environment in accordance with aspects of the present disclosure.

In various aspects of the present technology, the geolocation criteria for resources 110 can be specified in different ways in JIT policies. By way of example to illustrate, FIG. 2 illustrates geolocation criteria for JIT policies in which allowed geolocations 204 are specified for each resource 202. The allowed geolocations indicate the geolocations from which DevOps devices can access a resource 110. In such configurations, the geolocation criteria is satisfied if the geolocation information for the DevOps device 102 requesting JIT access matches one of the allowed geolocations for the requested resource 110. For instance, JIT access for resource 1 can be automatically granted by the JIT service 112 if the DevOps device 102 is located in the USA. JIT access for resource 2 can be automatically granted if the DevOps device 102 is located in the USA or Germany. The geolocation criteria for resource 3 is unrestricted. Therefore, the DevOps device 102 can be automatically granted access to resource 3 irrespective of the geolocation of the DevOps device 102.

Figure 3:
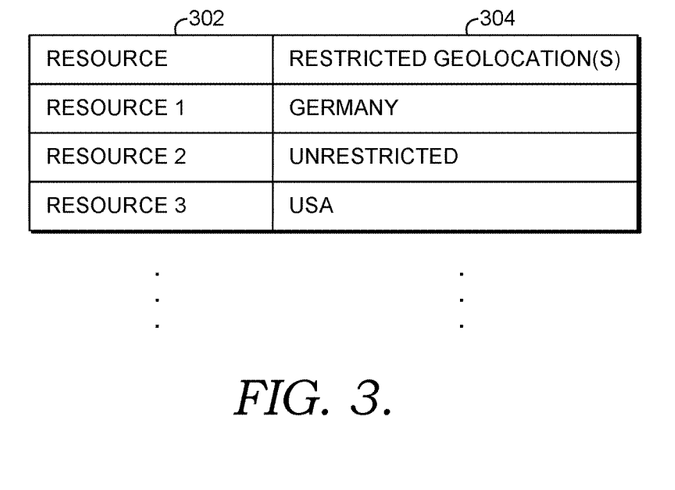

FIG. 3 illustrates an example in which geolocation criteria of JIT policies specify restricted geolocations 304 for each resource 302. The restricted geolocations indicate the geolocations from which DevOps devices cannot access a resource. In such configurations, the geolocation criteria is satisfied if the geolocation information for the DevOps device 102 requesting JIT access does not match any of the restricted geolocations for the requested resource 110. For instance, JIT access for resource 1 can be automatically granted if the DevOps device 102 is not located in Germany. JIT access for resource 2 is unrestricted. Therefore, the DevOps device 102 can be automatically granted access to resource 2 irrespective of the geolocation of the DevOps device 102. JIT access for resource 3 can be automatically granted if the DevOps device 102 is not located in the USA.

Figure 4:
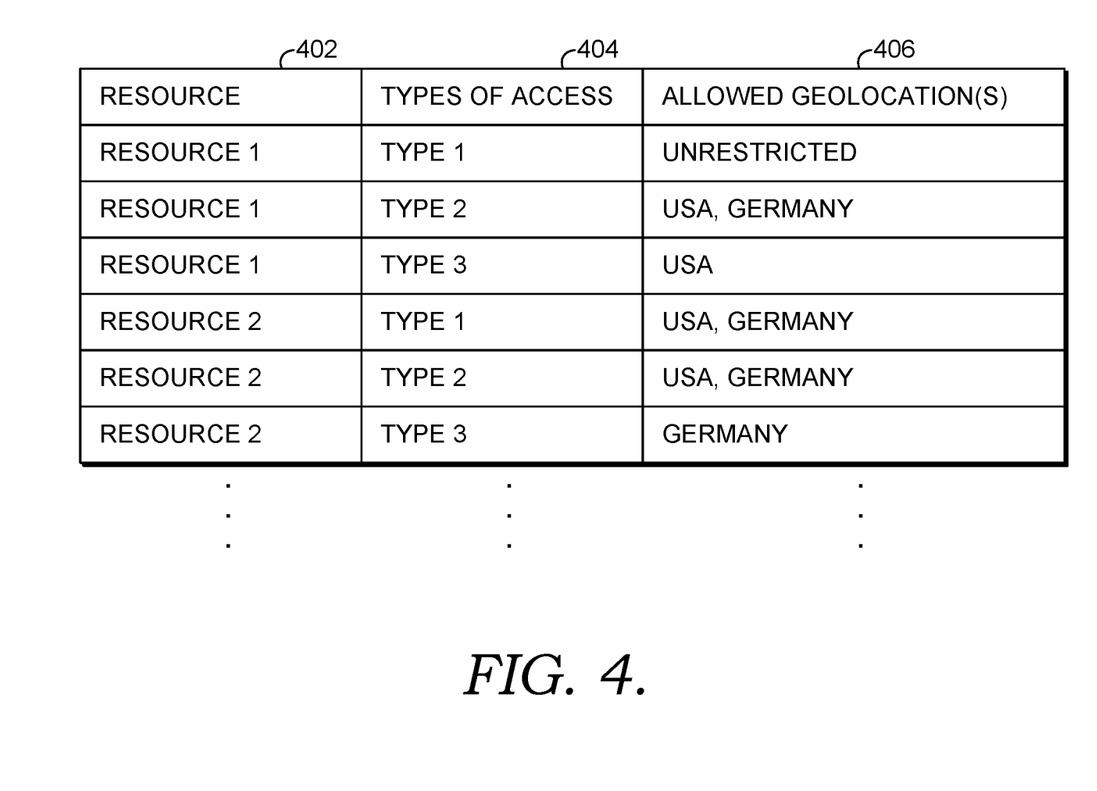

In some configurations, the level or type of access requested for a resource 110 is considered when determining whether to automatically grant JIT access based on geolocation. For instance, different allowed geolocations or restricted geolocations can be specified for different levels or types of access to each resource. By way of example to illustrate, FIG. 4 shows geolocation criteria that specifies allowed geolocations 406 for each of several types of access 404 to each resource 402. For instance, a first type of access to resource 1 is unrestricted by geolocation. Therefore, the DevOps device 102 can be automatically granted JIT access to resource 1 using the first type of access regardless of its geolocation. JIT access for the second type of access to resource 1 can be automatically granted only if the DevOps device 102 is located in the USA or Germany. JIT access for the third type of access to resource 1 can be automatically granted only if the DevOps device 102 is located in the USA.

Figure 5:
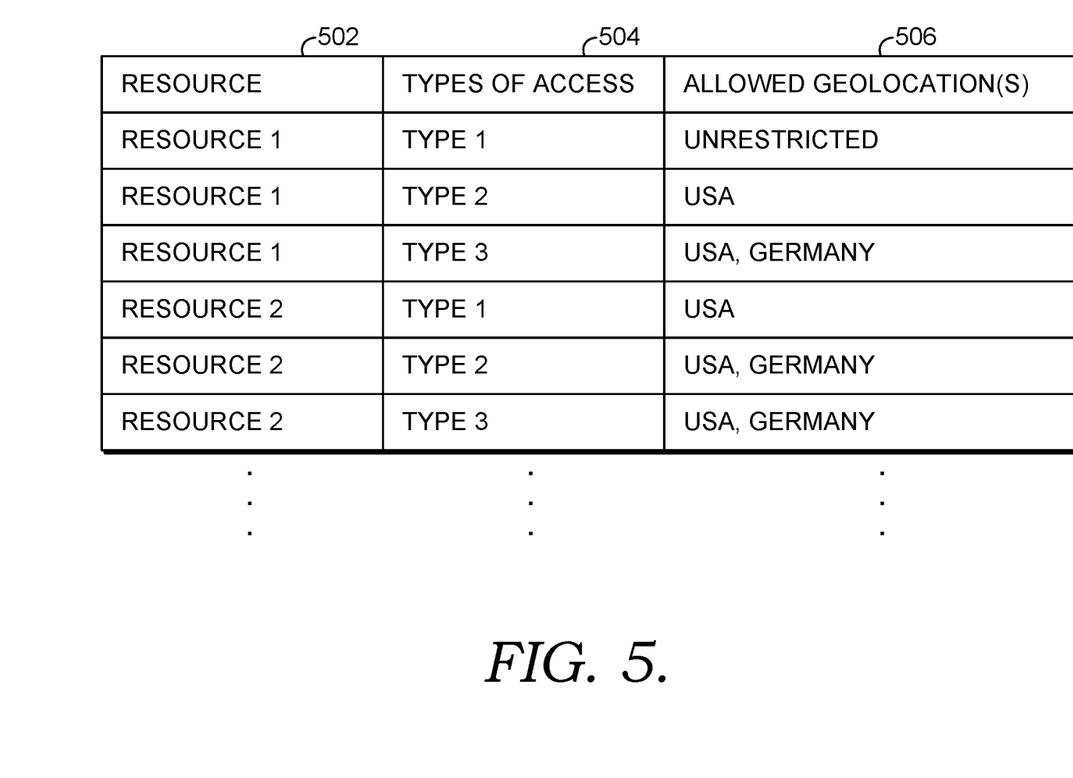

FIG. 5 illustrates an example in which geolocation criteria of JIT policies specify restricted geolocations 506 for each of several types of access 504 to each resource 502. For instance, a first type of access to resource 1 is unrestricted by geolocation. Therefore, the DevOps device 102 can be automatically granted JIT access to resource 1 using the first type of access regardless of its location. JIT access for the second type of access to resource 1 can be automatically granted only if the DevOps device 102 is not located in the USA. JIT access for the third type of access to resource 2 can be automatically granted only if the DevOps device 102 is not located in the USA or Germany.

In some aspects of the present technology, the determination of whether to automatically grant a DevOps device JIT access to a requested resource is based at least in part on the DevOps personnel meeting certain screening requirements. With reference again to FIG. 1, the JIT policy for at least some resources 110 in the production environment 108 of the cloud computing environment 106 sets forth screening requirements that restrict access to the resources 110 to DevOps personnel who meet the screening requirements. The screening requirements may be based on various regulatory and/or compliance requirements that apply to the cloud computing environment 106 dictating access to resources 110 in the cloud computing environment 106. The screening requirements could be, for instance, different levels of screening that a DevOps personnel could be required to have completed. For example, the screening requirements could be background checks, criminal checks, and/or other security clearance procedures.

When a JIT access request for a resource 110 is received by the JIT service 112, the JIT service determines whether the JIT policy for the requested resource 110 includes screening criteria. If the JIT policy includes screening criteria, the JIT service 112 determines an identity of the DevOps personnel requesting the JIT access. For instance, the JIT access request may include a user identifier to identify the DevOps personnel. The JIT service 112 then accesses a DevOps screening database 120 that stores information regarding various DevOps personnel. The DevOps screening database 120 can include information regarding screening requirements that each DevOps personnel satisfies. For instance, the screening information for each DevOps personnel could indicate a security level approved for the DevOps personnel and/or a variety of different background checks, criminal checks, and/or other screening procedures that have been completed for the DevOps personnel.

The JIT service 112 determines whether the information from the DevOps screening database 120 for the DevOps personnel requesting the JIT access satisfies the screening criteria for the requested resource 110. If the screening criteria and any other criteria specified by the JIT policy for the requested resource 110 are satisfied, the JIT access is automatically granted.

In some configurations, the screening criteria in the JIT policy for a resource 110 can specify different screening requirements for different levels or types of access to the resource 110. For instance, a first type of access to the resource 110 may not require any screening requirements, a second type of access to the resource may require a first screening requirement, and a third type of access to the resource may require the first screening requirement and a second screening requirement. In such configurations, the level or type of access requested is used to determine the applicable screening requirement from the JIT policy for the requested resource and the information for the DevOps personnel is evaluated to determine of that applicable screening requirement is met.

Although the system 100 in FIG. 1 illustrates a single DevOps device accessing a single cloud computing environment, it should be understood that the system can be configured with any number of DevOps devices accessing any number of cloud computing environments. For instance, the portal 116 on the DevOps device 102 can be configured to access other cloud computing environments in addition to the cloud computing environment 106. Each cloud computing environment can have its own JIT policies for accessing resources within its production environment. As such, different cloud computing environments can have different JIT policies. For example, two cloud computing environments could be located in different countries—one in the USA and the other in Germany. The geolocation criteria and/or screening requirements for resources can differ between the two cloud computing environments. As such, the DevOps device 102 could be automatically granted JIT access to a particular type of resource in the cloud computing environment located in the USA while being denied JIT access to the same type of resource in the cloud computing environment located in Germany. Additionally, the DevOps device 102 could be automatically granted JIT access to a particular type of resource in the cloud computing environment located in the USA based on the DevOps personnel satisfying the screening requirements for that resource while being denied JIT access to the same type of resource in the cloud computing environment located in Germany based on the DevOps personnel not satisfying the screening requirements for that resource.

Figure 6:
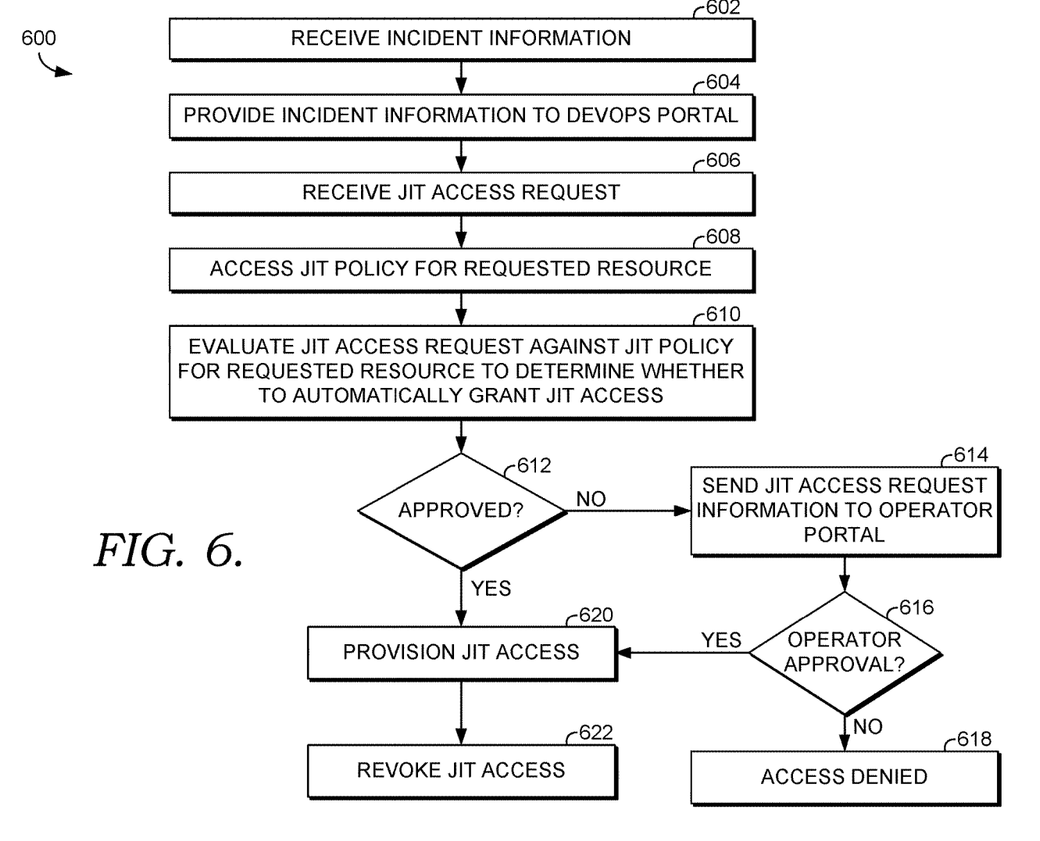
FIG. 6 is a flow diagram showing a method for incident management using JIT access to resources in a cloud computing environment in accordance with aspects of the present disclosure.

Turning now to FIG. 6, a flow diagram is provided illustrating a method 600 for providing a DevOps device with JIT access to a resource in the production environment of a cloud computing environment. As shown at block 602, incident information is received and logged. The incident information is provided to the DevOps personnel, for instance via a portal on the DevOps device, as shown at block 604. The DevOps personnel reviews the incident information and determines that JIT access is needed to access and resolve the incident. Accordingly, a JIT access request from the DevOps personnel is received, as shown at block 606. For instance, the JIT access request may be communicated from the portal on the DevOps device and received by a JIT service for the cloud computing environment. The JIT access request can specify a variety of information regarding the request, such as, for instance, information regarding the resource to be accessed, the requesting DevOps personnel (e.g., user identifier, team, role, etc.), whether an incident is identified, a type of incident, and the level/type of access requested.

Based on the resource identified by the JIT access request, a JIT policy for the resource is retrieved from a database of JIT policies for resources within the production environment of the cloud computing environment, as shown at block 608. For instance, the JIT service can use an identifier of the resource to look up the JIT policy in the database of JIT policies. Alternatively, JIT policies in the database can correspond to different types of resources, and the JIT policy for the requested resource is retrieved based on the type of resource.

Figure 7:
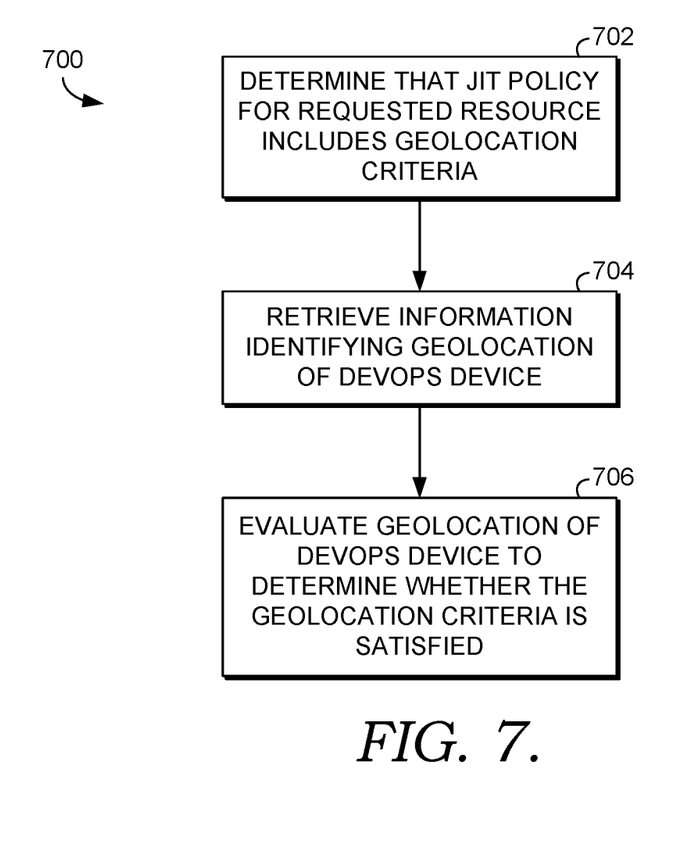
FIG. 7 is a flow diagram showing a method for evaluating a JIT access request based on geolocation criteria in accordance with aspects of the present disclosure.
Figure 8:
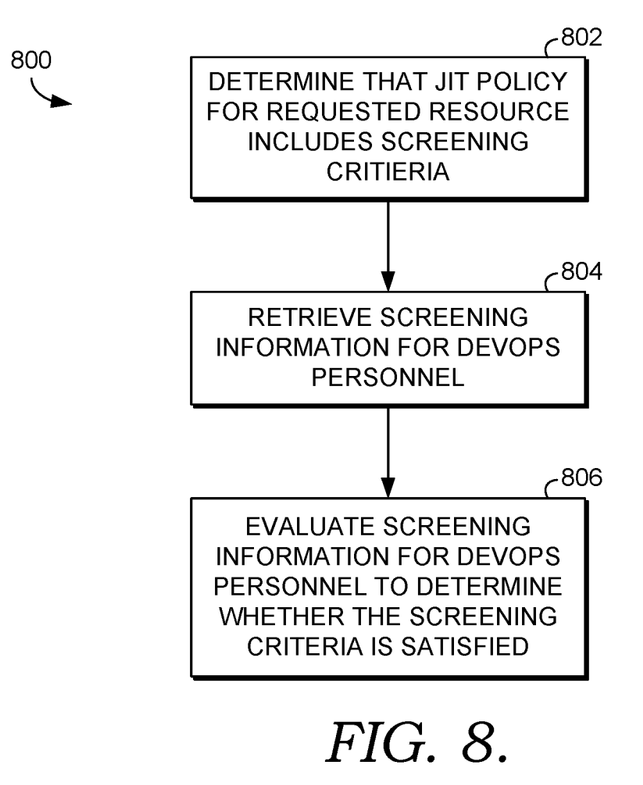
FIG. 8 is a flow diagram showing a method for evaluating a JIT access requested based on screening criteria in accordance with aspects of the present disclosure.

The JIT access request is evaluated by the JIT service to determine whether to automatically grant the request, as shown at block 610. Details regarding the JIT access request are compared against the JIT policy for the requested resource. The evaluation can be based on a variety of different criteria such as criteria regarding whether the JIT access is requested in response to an incident or the type of incident that instigated the JIT access request. In accordance with aspects of the present disclosure, the evaluation at block 610 is based at least in part on geolocation criteria and/or screening criteria. FIGS. 7 and 8 provide flow diagrams showing methods 700 and 800 for evaluating a JIT access request with respect to geolocation criteria and screening criteria, respectively. With reference initially to FIG. 7, the process includes making a determination based on the JIT policy for the requested resource that JIT access to the resource is governed at least in part based on geolocation criteria, as shown at block 702. For instance, the JIT service may determine that the JIT policy for the requested resource includes geolocation criteria restricting JIT access to the requested resource based on geolocation.

Information identifying a geolocation of the DevOps device requesting JIT access is retrieved, as shown at block 704. In some instances, the geolocation information of the DevOps device is included in the JIT access request. In other instances, the geolocation information is requested in response to the JIT service determining that the JIT policy for the resource includes geolocation criteria. The geolocation information can be any information specifying a location of the DevOps device, such as GPS coordinates. In some instances, the DevOps device may not be configured to provide geolocation information (e.g., the DevOps device is not equipped with a GPS device). In such instances, the geolocation information for the DevOps device may be provided using a secondary device capable of providing geolocation information (e.g., one equipped with a GPS device). For instance, a known mobile device for the DevOps personnel could be used to provide location information.

The geolocation of the DevOps device is evaluated to determine whether the geolocation criteria of the JIT policy is satisfied, as shown at block 706. This may include comparing the geolocation information for the DevOps device against the geolocation criteria to determine if the geolocation criteria is satisfied. As noted above, in some configurations, the geolocation criteria specifies allowed geolocations. In such configurations, a determination is made regarding whether the geolocation information for the DevOps device matches an allowed geolocation specified by the geolocation criteria. In some configurations, the geolocation criteria specifies restricted geolocations. In such configurations, a determination is made regarding whether the geolocation information for the DevOps device does not correspond to any restricted geolocation specified by the geolocation criteria. In some instances, the geolocation criteria is also based on the level or type of access to the resource. In such instances, the level or type of access requested is used to determine the applicable allowed geolocations or restricted geolocations from the geolocation criteria.

With respect to screening criteria, as shown in FIG. 8, the process includes making a determination based on the JIT policy for the requested resource that JIT access to the resource is governed at least in part based on screening criteria, as shown at block 802. For instance, the JIT service may determine that the JIT policy for the requested resource includes screening criteria restricting JIT access to the requested resource based the DevOps personnel meeting at least one screening requirement.

Screening information for the DevOps personnel is retrieved, as shown at block 804. For instance, the JIT service may employ a user identifier for the DevOps personnel to retrieve the screening information from a screening database storing screening information for a number of DevOps personnel. The screening information is then evaluated to determine if the screening criteria in the JIT policy for the requested resource is satisfied. This may include determining whether the screening information for the DevOps personnel indicates that one or more screening requirements have been met. In some instances, the screening requirement is also based on the level or type of access to the resource. In such instances, the level or type of access requested is used to determine the applicable screening requirements from the screening criteria.

Returning to FIG. 6, a determination is made regarding whether to approve the request for JIT access based on the evaluation of the JIT access request against the JIT policy for the requested resource, as shown at block 612. As discussed above, when the JIT policy for the requested resource includes geolocation criteria, the determination is based at least in part on whether the geolocation information for the DevOps device satisfies the geolocation criteria. Additionally or alternatively, when the JIT policy for the requested resource includes screening criteria, the determination is based at least in part on whether information for the DevOps personnel satisfies the screening requirement(s) set forth by the screening criteria.

If the JIT access is not automatically approved, the JIT access request is sent to the operating personnel, as shown at block 614. The operating personnel reviews details of the JIT access request and determines whether to approve the request. Accordingly, a determination is made at block 616 regarding whether approval is received. If the JIT access is denied, a notice is sent to the DevOps device regarding the denial, as shown at block 618.

Alternatively, if the JIT access is automatically approved by the JIT service based on the JIT policy for the requested resource or approved by the operating personnel, the JIT access to the resource is provisioned for the DevOps personnel, as shown at block 620. This includes setting a time limit for the JIT access and configuring the access such that the DevOps device can access the resource with only a certain level or type of access, if applicable. The DevOps personnel then accesses the resource in the production environment in accordance with the approved JIT access to troubleshoot the incident. After the time limit expires, the JIT access to the resource is revoked, as shown at block 622. Alternatively, the operations personnel or DevOps personnel may select to revoke the JIT access before the time limit expires if the JIT access is no longer needed (e.g., the incident has been resolved).

Figure 9:
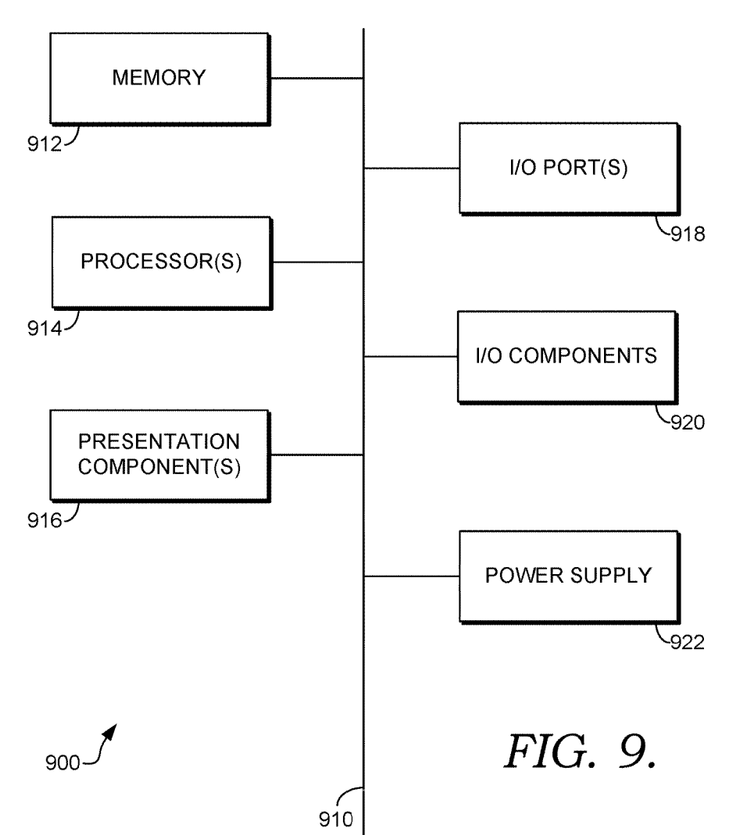
FIG. 9 is a block diagram of an exemplary computing environment suitable for use in implementing aspects of the present disclosure.

Having described various implements, an exemplary operating environment suitable for implementing aspects of the present disclosure is now described. Referring initially to FIG. 9 in particular, an exemplary operating environment for implementing aspects of the present disclosure is shown and designated generally as computing device 900. Computing device 900 is but one example of a suitable computing environment and is not intended to suggest any limitation as to the scope of use or functionality of the technology described herein. Neither should the computing device 900 be interpreted as having any dependency or requirement relating to any one or combination of components illustrated.

Aspects of the disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Aspects of the disclosure may be practiced in a variety of system configurations, including hand-held devices, consumer electronics, general-purpose computers, more specialty computing devices, etc. Aspects of the disclosure may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output (I/O) ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more aspects of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, aspects of the technology described herein are generally directed to providing for incident management for a cloud computing environment in a manner that maintains control over restricted data. Aspects of the present disclosure have been described in relation to particular configurations, which are intended in all respects to be illustrative rather than restrictive. Alternative configurations will become apparent to those of ordinary skill in the art to which the present disclosure pertains without departing from its scope.

From the foregoing, it will be seen that the technology described herein is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized system comprising:
one or more hardware processors; and
one or more computer storage media storing computer-useable instructions that, when used by the one or more hardware processors, cause the one or more hardware processors to:
receive, at a service within a cloud computing environment, a request for just-in-time (JIT) access to a resource within a production environment of the cloud computing environment, the request being received from a portal on a DevOps device operated by a DevOps personnel who does not have persistent access to restricted data in the cloud computing environment, the request specifying request parameters including a level or type of access requested and information regarding an incident;
access, from a database of JIT policies stored in the cloud computing environment for a plurality of resources within the production environment of the cloud computing environment, a JIT policy for the resource specified by the request, the JIT policy stored in the database for processing by the service within the cloud computing environment to allow the service to automatically determine whether to grant JIT access to the resource;
determine, from the JIT policy for the resource, screening criteria restricting JIT access to the resource, the screening criteria specifying one or more security clearance procedures;
receive screening information for the DevOps personnel;
determine, by the service within the cloud computing environment, whether to approve the request for JIT access based at least in part on automatically evaluating the request parameters using the JIT policy for the resource to determine whether the level or type of access requested is automatically approved depending on: (1) a type of the incident; (2) whether the incident is active; and (3) a comparison of the screening information for the DevOps personnel to the screening criteria from the JIT policy to verify that the one or more security clearance procedures have been performed for the DevOps personnel;

if it is determined to automatically approve the request for JIT access, provision a JIT access session for the DevOps device including setting a time limit for the JIT access session; and if it is determined not to automatically approve the request for JIT access, send the request for JIT access to a portal on an operator device for review by an operating personnel who has access to restricted data in the cloud computing environment.

2. The system of claim 1, wherein the JIT policy includes additional criteria, and wherein the determination to approve the request for JIT access is also based on the additional criteria being satisfied.

3. The system of claim 1, wherein receiving screening information for the DevOps personnel comprises retrieving the screening information for the DevOps personnel from a database of screening information for a plurality of DevOps personnel.

4. The system of claim 3, wherein the request for JIT access includes a user identifier for the DevOps personnel, and wherein the screening information for the DevOps personnel is accessed from the database using the user identifier.

5. The system of claim 1, wherein the one or more security clearance procedures comprises one or more background checks or one or more criminal checks.

6. The system of claim 5, wherein comparing the screening information for the DevOps personnel to the screening criteria comprises comparing the screening information to the one or more security clearance procedures to verify the one or more background checks or one or more criminal checks have been performed for the DevOps personnel.

7. The system of claim 1, wherein the JIT access session is revoked when the time limit for the JIT access session expires.

8. The system of claim 1, wherein the JIT access session is revoked in response to a command from the DevOps personnel or an operator personnel during the JIT access session.

9. One or more computer storage media storing computer-useable instructions that, when used by one or more computing devices, cause the one or more computing devices to perform operations comprising:

receiving incident information regarding an incident in a cloud computing environment;

providing the incident information to a portal on a DevOps device for review by a DevOps personnel who does not have persistent access to restricted data in the cloud computing environment;

receiving, at a service within the cloud computing environment from the portal on the DevOps device, a request for a just-in-time (JIT) access session to access a resource in a production environment of the cloud computing environment, the request specifying request parameters including a level or type of access requested and information regarding an incident;

accessing a JIT policy for the resource from a database of JIT policies stored in the cloud computing environment for a plurality of resources in the production environment of the cloud computing environment, the JIT policy stored in the database for processing by the service within the cloud computing environment to allow the service to automatically determine whether to grant JIT access to the resource;

determining that the JIT policy for the resource includes screening criteria restricting JIT access to the resource, the screening criteria specifying one or more security clearance procedures;

accessing screening information for the DevOps personnel;

determining, by the service within the cloud computing environment, whether to automatically approve the request for the JIT access session based at least in part automatically evaluating the request parameters using the JIT policy for the resource to determine whether the level or type of access requested is automatically approved depending on: (1) a type of the incident; (2) whether the incident is active; and (3) a comparison of the screening information for the DevOps personnel to the screening criteria of the JIT policy for the resource to verify that the one or more security clearance procedures have been performed for the DevOps personnel;

if it is determined to automatically approve the request for the JIT access session, provisioning the JIT access session for the DevOps device including setting a time limit for the JIT access; and if it is determined not to automatically approve the request for the JIT access session, sending the request for the JIT access session to a portal on an operator device for review by an operating personnel who has access to restricted data in the cloud computing environment.

10. The one or more computer storage media of claim 9, wherein the JIT policy includes one or more additional criteria, and wherein determining whether to automatically approve the request for the JIT access session comprises determining whether information regarding the request for the JIT access session also satisfies the one or more additional criteria.

11. The one or more computer storage media of claim 9, wherein receiving screening information for the DevOps personnel comprises retrieving the screening information for the DevOps personnel from a database of screening information for a plurality of DevOps personnel using a user identifier for the DevOps personnel included in the request for JIT access.

12. The one or more computer storage media of claim 9, wherein the screening criteria specifies one or more screening requirements, and wherein comparing the screening information for the DevOps personnel to the screening criteria comprises comparing the screening information to the one or more screening requirements to determine if the one or more screening requirements are satisfied based on the screening information.

13. The one or more computer storage media of claim 9, wherein the JIT access session is revoked when the time limit for the JIT access expires.

14. The one or more computer storage media of claim 9, wherein provisioning the JIT access session comprises providing the DevOps device the level or type of access to the resource for the time limit.

15. A computerized method comprising:

receiving, at a service within a cloud computing environment, a request for a just-in-time (JIT) access session to a resource within the cloud computing environment, the request being received from a DevOps device operated by a DevOps personnel who does not have persistent access to restricted data in the cloud computing environment, the request specifying request parameters including a level or type of access requested and information regarding an incident;

accessing, from a database of JIT policies stored in the cloud computing environment for a plurality of resources within the cloud computing environment, a JIT policy for the resource specified by the request, the JIT policy stored in the database for processing by the service within the cloud computing environment to allow the service to automatically determine whether to grant JIT access to the resource;

identifying screening criteria from the JIT policy for the resource, the screening criteria specifying one or more security clearance procedures;

receiving screening information for the DevOps personnel;

determining, by the service within the cloud computing environment, whether to approve the request for JIT access based at least in part on automatically evaluating the request parameters using the JIT policy for the resource to determine whether the level or type of access requested is automatically approved depending on: (1) a type of the incident; (2) whether the incident is active; and (3) a determination that the screening information for the DevOps personnel satisfies the screening criteria by verifying that the one or more security clearance procedures have been performed for the DevOps personnel; and if it is determined to automatically approve the request for JIT access, provisioning the JIT access session for the DevOps device based on determining the screening information for the DevOps personnel satisfies the screening criteria; and if it is determined not to automatically approve the request for JIT access, sending the request for JIT access to a portal on an operator device for review by an operating personnel who has access to restricted data in the cloud computing environment.

16. The computerized method of claim 15, wherein the screening criteria sets forth one or more screening requirements for each of a plurality of levels or types of access to the resource.

17. The computerized method of claim 16, wherein determining the screening information for the DevOps personnel satisfies the screening criteria comprises:

identifying at least one screening requirement from the screening criteria based on the level or type of access to the resource requested; and determining the screening information satisfies the at least one screening requirement.

18. The computerized method of claim 15, wherein the JIT access session is provisioned by providing the DevOps device the level or type of access to the resource for a set time period.

* * * * *